US012296650B2

(12) United States Patent
Faivre et al.

(10) Patent No.: US 12,296,650 B2
(45) Date of Patent: May 13, 2025

(54) ELECTRICAL HEATING DEVICE, IN PARTICULAR FOR A MOTOR VEHICLE

(71) Applicant: Valeo Systemes Thermiques, Le Mesnil Saint-Denis (FR)

(72) Inventors: Arnaud Faivre, Le Mesnil Saint-Denis (FR); Laurent Decool, Le Mesnil Saint-Denis (FR); Yann Couapel, Le Mesnil Saint-Denis (FR); Serif Karaaslan, Le Mesnil Saint-Denis (FR); Vincent Lamande, Le Mesnil Saint-Denis (FR)

(73) Assignee: VALEO SYSTEMES THERMIQUES, Le Mesnil-Saint-Denis (FR)

( * ) Notice: Subject to any disclaimer, the term of this patent is extended or adjusted under 35 U.S.C. 154(b) by 197 days.

(21) Appl. No.: 17/784,499

(22) PCT Filed: Dec. 2, 2020

(86) PCT No.: PCT/FR2020/052248
§ 371 (c)(1),
(2) Date: Jun. 10, 2022

(87) PCT Pub. No.: WO2021/116563
PCT Pub. Date: Jun. 17, 2021

(65) Prior Publication Data

US 2023/0010073 A1 Jan. 12, 2023

(30) Foreign Application Priority Data

Dec. 12, 2019 (FR) ...................................... 1914261

(51) Int. Cl.
*B60H 1/22* (2006.01)
*F24H 1/00* (2022.01)

(52) U.S. Cl.
CPC .......... *B60H 1/2221* (2013.01); *F24H 1/009* (2013.01); *B60H 2001/2278* (2013.01)

(58) Field of Classification Search
CPC .......... B60H 1/2221; B60H 2001/2278; F24H 1/009; F24H 1/101; F24H 1/102;
(Continued)

(56) References Cited

U.S. PATENT DOCUMENTS 6,259,070 B1 * 7/2001 Audet ..................... D06F 58/26 219/532
2008/0087234 A1 * 4/2008 Montanaro ........... F24H 9/1818 122/19.2
2011/0019983 A1 1/2011 Perry et al.

FOREIGN PATENT DOCUMENTS

CN 201401951 Y 2/2010
GB 2512353 A 10/2014
(Continued)

OTHER PUBLICATIONS

International Search Report and Written Opinion issued in corresponding International Patent Application No. PCT/FR2020/052248, mailed on Feb. 23, 2021 (11 pages).
(Continued)

*Primary Examiner* — Hung D Nguyen
*Assistant Examiner* — Bonita Khlok
(74) *Attorney, Agent, or Firm* — Osha Bergman Watanabe & Burton LLP

(57) ABSTRACT

The invention relates to a device for electrically heating (1) a liquid, comprising a heating body (11), and a housing (3) defining, at least in part, a chamber (30) for circulating the liquid, the heating body (11) comprising at least one electric
(Continued)

heating element (7, 9) extending in the chamber (30) and attached to an inner wall of the device defining, at least in part, the chamber (30) for circulating the liquid, so as to form a first mechanical connection. According to the invention, the electric heating device (1) comprises at least one mechanical connecting element (21) arranged in the chamber (30) and mechanically connecting the at least one electric heating element (7, 9) to an inner surface of the housing (3) extending opposite the heating body (11), so as to form a second mechanical connection separate from the first mechanical connection.

4 Claims, 12 Drawing Sheets

(58) Field of Classification Search
CPC . F24H 1/103; F24H 1/12; F24H 1/121; F24H 1/202; F24H 9/139; F24H 9/1818; H05B 3/0042; H05B 3/40; H05B 2203/021
See application file for complete search history.

(56) References Cited

FOREIGN PATENT DOCUMENTS

| | | | |
|---|---|---|---|
| GB | 2537715 | A | 10/2016 |
| JP | H04-010915 | U | 1/1992 |
| JP | H11-151931 | A | 6/1999 |
| JP | 2004-047148 | A | 2/2004 |
| JP | 2017-503990 | A | 2/2017 |
| WO | 2016/181092 | A1 | 11/2016 |

OTHER PUBLICATIONS

Office Action issued in counterpart Japanese Patent Application No. JP 2022-535766 mailed Jul. 28, 2023 (16 pages).
Office Action issued in counterpart Japanese Patent Application No. 2022-535766 mailed Mar. 12, 2024 (9 pages).
Office Action issued in counterpart Chinese Patent Application No. 202080092849.X mailed Nov. 22, 2024 (17 pages).

* cited by examiner

A 33
1
30
3
31
5
7
9
91
71

23
231
21
11
233
7
9

19
5
d2
d1

231
1
233
33
3
9

30
7
11
31
19
5

21

233
231
233
23
233

ELECTRICAL HEATING DEVICE, IN PARTICULAR FOR A MOTOR VEHICLE

The field of the present invention is that of electrical devices for heating and circulating a fluid, in particular a liquid, for example for an installation for heating, ventilating and/or air-conditioning an interior of a motor vehicle. More particularly, the invention relates to the electrical heating devices used for such installations in electric or hybrid motor vehicles that are equipped with a high-voltage electric power supply network.

The air intended for the thermal treatment of the interior of a motor vehicle with a heat engine is heated by heat exchange between an air flow and a heat-transfer fluid such as a liquid, via a heat exchanger. In the case of hybrid or electric vehicles, electrical heating devices are known which constitute a source of heat energy and in which an electric current flows to raise the temperature of a heating body extending longitudinally inside a housing of this heating device. The liquid to be heated thus passes through the electrical heating device and is brought into contact with the heating body. There is then an exchange of heat energy between the heating body and the liquid intended to heat the vehicle interior, which thus heats up in turn.

The heating body usually comprises at least one electrical heating element, for example one or more heating resistors. In order to obtain heating power that is sufficient for the desired operation, the number of electrical heating elements in a single electrical heating device may be increased.

Moreover, the housing can house an electrical circuit bearing electrical components and making it possible in particular to connect electrical terminals of each electrical heating element to an electrical power supply system. It is therefore necessary to provide a sealed separation between this electrical circuit and the circuit of the liquid to be heated.

According to one known solution, the electrical heating device comprises a housing delimiting at least partially a liquid circulation chamber within the housing. The electrical heating device comprises an inner wall at least partially delimiting this chamber, bearing the electrical heating element or elements. Electrical terminals may pass through such a wall, these electrical terminals then opening into a cavity housing the electrical circuit. It is necessary to ensure sealing at this wall.

When there are several electrical heating elements, it is advantageous to secure all the electrical heating elements to the same wall so as to concentrate the sealing measures on this wall. The electrical heating elements are therefore mounted cantilevered in the housing.

In use, the electrical heating device, mounted on a motor vehicle, indeed for example in the engine, is caused to move, or vibrate, and the various parts of the electrical heating device can collide, in particular the electrical heating elements such as heating resistors of the heating body, colliding with one another and with the inside of the housing. This generates noise, and moreover can cause the parts which come into contact to wear out more quickly.

The invention aims to at least partially overcome these problems found in the prior art by proposing an electrical heating device making it possible to limit the noise due to vibration likely to be generated during use in a motor vehicle in particular.

To this end, the subject matter of the invention is an electrical heating device for heating a liquid, in particular for a motor vehicle, comprising a heating body, and a housing delimiting at least partially a liquid circulation chamber, the heating body comprising at least one electrical heating element extending in the liquid circulation chamber and secured to an inner wall of said device delimiting, at least partially, the liquid circulation chamber, so as to form a first mechanical connection. According to the invention, the electrical heating device comprises at least one mechanical connection element arranged inside the liquid circulation chamber, mechanically connecting said at least one electrical heating element and an internal surface of the housing extending facing the heating body, so as to form a second mechanical connection distinct from the first mechanical connection.

An additional mechanical connection is provided which supplements the first mechanical connection, thus limiting the cantilever of the electrical heating element or elements within the housing.

This additional mechanical connection makes it possible to absorb the ranges of tolerances between the parts and to limit the generation of noise or vibration during use in a motor vehicle in particular.

The additional mechanical connection also forms a thermal bridge between the electrical heating element or elements and the housing, which allows more accurate measurement of the temperature of the electrical heating elements, even when there is no liquid in the chamber. The liquid is for example glycol water.

The electrical heating device may also have one or more of the following features described below, considered separately or in combination.

Said at least one electrical heating element may take the form of a heating resistor.

According to one example, the heating body comprises a base secured to the housing, such that the housing and the base delimit, at least partially, the liquid circulation chamber.

The first mechanical connection is for example between said at least one electrical heating element and the base. In this case, the inner wall bearing said at least one electrical heating element is defined by the base. This is the wall of the base on the side facing the liquid circulation chamber.

Said at least one electrical heating element comprises two terminal sections provided with an electrical terminal, for example secured to the base.

According to one aspect of the invention, the heating body comprises at least two electrical heating elements extending in the liquid circulation chamber, all the electrical heating elements being for example secured to the base.

Preferably, the second mechanical connection is ensured by at least three points of contact with the or each electrical heating element.

The electrical heating element or at least one of the electrical heating elements may have at least partially a helical shape.

Said at least one mechanical connection element may be arranged between the internal surface of the housing and at least one winding of the electrical heating element or of at least one of the electrical heating elements.

According to one example, the or at least one of the electrical heating elements comprises a first terminal section, followed by an intermediate portion, for example a wound portion, followed by a rectilinear second terminal section, the first terminal section and the second terminal section extending between the intermediate portion, the intermediate portion being for example a wound portion, and the base.

Said at least one mechanical connection element is for example arranged in the liquid circulation chamber opposite the base.

According to one exemplary embodiment, the electrical heating element or at least one of the electrical heating elements extends longitudinally in the liquid circulation chamber.

Said at least one mechanical connection element may be arranged in the liquid circulation chamber, mechanically connecting the internal surface of the housing to a longitudinal end of the electrical heating element or of at least one of the electrical heating elements.

According to one embodiment, the heating body comprises at least two electrical heating elements arranged in the axial extension of one another. The electrical heating elements arranged in the axial extension of one another are wound for example around a common axis.

Said at least one mechanical connection element may be arranged axially between the two electrical heating elements.

According to one embodiment, the heating body comprises at least two concentric electrical heating elements, one being placed around the other. More specifically, at least one external electrical heating element is placed around at least one internal electrical heating element. The axes of winding of the electrical heating elements may coincide.

The heating body comprises for example at least a first electrical heating element defined by a first diameter, and a second electrical heating element defined by a second diameter smaller than the first diameter, such that the first electrical heating element is placed around the second electrical heating element.

The first and second electrical heating elements have, for example, at least partially a helical shape.

Said at least one mechanical connection element may be arranged at least partially between the concentric electrical heating elements.

According to one aspect of the invention, said at least one mechanical connection element takes the form of an intermediate part, arranged between the internal surface of the housing and the heating body. The intermediate part is therefore an additional part added to the electrical heating device.

According to one option, several points of contact may be formed by a single intermediate part.

According to another option, several intermediate parts are provided so as to each ensure at least one point of contact.

The intermediate part may be made of a thermally conductive material, preferably metal, so as to form a thermal bridge.

Such a metal makes it possible to withstand the operating temperatures of the electrical heating elements, such as heating resistors, with which said at least one mechanical connection element is in mechanical contact.

Advantageously, the intermediate part is at least partially elastic and flexible. This gives a spring effect to the intermediate part, which makes it possible to compensate for the ranges of tolerances, shifting or dimensional errors of the electrical heating device.

According to one aspect of the invention, the intermediate part comprises a core arranged transversely facing a longitudinal end of the or one of the electrical heating elements, and a predefined number of contact tabs extending from the core in the direction of the heating body and arranged in contact with the electrical heating element.

The intermediate part comprises for example at least three contact tabs.

The contact tabs may extend in the direction of the heating body, being arranged in contact with at least one electrical heating element, over the same length or different lengths.

The contact tabs may be of any suitable shape to ensure contact with one or more electrical heating elements. Purely as an example, the contact tabs may be straight, curved, or even have a concave surface. The contact tabs may be inclined with respect to the longitudinal axis of the electrical heating elements, for example making an angle of around 30° to 45° before contact. The contact tabs may be alternately inclined in different directions.

The inclination or curvature of the tabs gives flexibility to the assembly, allowing deformation of these contact tabs when the or one of the electrical heating elements bears against the intermediate part.

According to one embodiment, the core of the intermediate part is arranged to bear against the internal surface of the housing opposite the base. It is held in place by the intermediate part being pressed between the electrical heating elements and the internal surface opposite the base of the housing.

According to one variant, at least some contact tabs of the intermediate part may be arranged in contact with the internal surface of the housing. For example, it is possible to provide alternating tabs in contact with the internal surface of the housing and in contact with an electrical heating element.

Alternatively, each of the contact tabs arranged between the internal surface of the housing and an electrical heating element may be in contact with both.

The heating body defines for example a generally hollow shape, such as a cylindrical shape. In particular, at least one electrical heating element defines a generally hollow shape, such as a cylindrical shape.

According to one embodiment, the core of the intermediate part is of generally annular shape having an inside diameter smaller than an outside diameter. A first series of tabs, referred to as internal tabs, may extend from the inside of the annular shape toward the inside of the heating body, that is to say toward the inside of the generally hollow shape of the heating body, and a second series of tabs, referred to as external tabs, may extend from the outside of the annular shape toward the outside of the heating body, that is to say toward the outside of the generally hollow shape of the heating body.

The internal tabs extend for example toward the inside of the internal electrical heating element when the latter defines a generally hollow shape. The external tabs extend for example toward the outside of the external electrical heating element when the latter defines a generally hollow shape.

According to another embodiment, the core has the general shape of a disk.

In the configuration in which the heating body comprises at least two concentric electrical heating elements, one being placed around the other, at least some of the contact tabs of the intermediate part may be arranged between the concentric electrical heating elements.

According to one embodiment, all the contact tabs of the intermediate part may be arranged between the concentric electrical heating elements.

In a configuration of the intermediate part with contact tabs inclined in different orientations, first contact tabs may be arranged to bear against the external electrical heating element, and alternating second tabs may be arranged to bear against the internal electrical heating element.

According to another embodiment, the intermediate part is made in the form of a clip comprising a head arranged to bear on the external electrical heating element and comprising at least a first tab and a second tab extending from the head. The first tab is arranged to bear against the internal electrical heating element and the second tab is arranged to bear against the internal surface of the housing.

The head is for example of rounded shape complementary to a tubular shape of the electrical heating element.

The first tab may be straight.

The second tab may be straight. It is advantageously domed or convex with its convexity oriented toward the internal surface of the housing. The domed shape avoids damaging the internal surface of the housing.

The invention also relates to an installation for heating and/or ventilating and/or air-conditioning a flow of air, having an electrical heating device as defined above.

Further advantages and features of the invention will become more clearly apparent from reading the following description, given by way of illustrative and non-limiting example, and the appended drawings, in which.

In these figures, identical elements bear the same reference numerals.

The following embodiments are examples. Although the description refers to one or more embodiments, this does not necessarily mean that each reference relates to the same embodiment, or that the features apply only to a single embodiment. Individual features of various embodiments may also be combined or interchanged in order to create other embodiments.

In the description, certain elements may be indexed, such as first element or second element, for example. In this case, this is merely indexing for differentiating and denoting elements that are similar but not identical. This indexing does not imply that one element takes priority over another and such denominations can easily be interchanged without departing from the scope of the present description. This indexing does not imply an order in time either.

Figure 1:
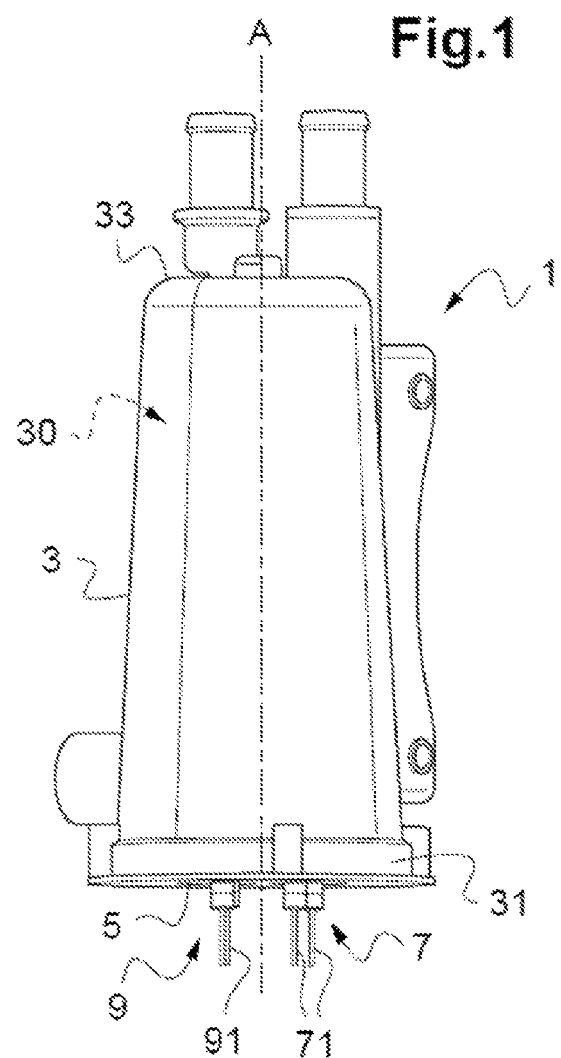
FIG. 1 shows an electrical heating device according to the invention.

Referring to FIG. 1, the invention relates to an electrical heating device 1, in particular for a motor vehicle such as an electric or hybrid vehicle. This electrical heating device 1 is intended in particular to interact with an installation for heating and/or ventilating and/or air-conditioning a flow of air, for such a motor vehicle. This is an electrical heating device 1 for heating a fluid, in particular a liquid such as glycol water.

The electrical heating device 1 comprises a housing 3. The housing 3 may have a generally cylindrical or conical shape. Alternatively, it may have a generally parallelepiped shape.

The electrical heating device 1 comprises a liquid circulation chamber 30 delimited at least partially by the housing 3.

The housing 3 extends for example longitudinally along an axis of extension of the electrical heating device 1, referred to as the longitudinal axis A. The housing 3 is delimited by a first longitudinal end 31 and by a second longitudinal end 33. The longitudinal ends 31 and 33 extend, for example, as shown, in planes parallel to one another, and orthogonal to the longitudinal axis A.

According to the particular embodiment shown, the electrical heating device 1 comprises a base 5, on which the housing 3 is secured, thus delimiting a chamber 30 for the circulation of the liquid inside the housing 3. The base 5 is arranged at the first longitudinal end 31 of the housing 3. The liquid circulation chamber 30 is centered on the longitudinal axis A. The liquid circulation chamber 30 is defined with a generally cylindrical or conical shape. Other alternatives may be considered, for example with a parallelepiped shape.

The base 5 may also create a separation between the liquid circulation chamber 30 and a cavity (not shown in FIG. 1) of the electrical heating device 1, for example of the housing 3, within which an electrical circuit may be mounted, for example.

The electrical heating device 1 further comprises an inner wall, at least partially delimiting the circulation chamber 30, which bears one or more electrical heating elements 7, 9, such as heating resistors. This inner wall forms a support for these electrical heating elements 7, 9. This inner wall may or may not be defined by the housing 3.

In particular, this inner wall may be defined by the base 5. The base 5 in this case bears the or a plurality of electrical heating elements 7, 9, such as heating resistors. The rest of the description concerns this particular embodiment of the inner wall defined by such a base 5. Of course, the invention is not limited to this particular example, and the rest of the description may be applied to another inner wall of the electrical heating device 1 not defined by such a base.

The electrical heating element or elements 7 and 9 extend inside the liquid circulation chamber 30. In operation, the liquid to be heated may circulate within this chamber 30 and rise in temperature on contact with the electrical heating element or elements 7, 9, by heat exchange with same. The heated liquid may then be discharged from the electrical heating device 1, so as to be sent to other components of the motor vehicle.

The electrical heating element or elements 7, 9 are secured to the base 5 thus forming a first mechanical connection between the electrical heating elements 7, 9 and the base 5. To this end, the electrical heating element or elements 7, 9 are inserted and secured, in a sealed manner, in holes (not visible) made in the base 5, such that the liquid circulating in the circulation chamber cannot leak out. The electrical heating element or elements 7, 9 are for example secured to the base 5 by welding.

The electrical heating element 7, respectively 9, is provided with electrical terminals 71, respectively 91. The electrical terminals 71, 91 extend for example in a direction substantially parallel to the longitudinal axis A.

The electrical terminals 71, 91 extend from the side of the base 5 opposite the liquid circulation chamber 30, so as to be connected to an electrical power supply, for example via the electrical circuit.

Figure 2:
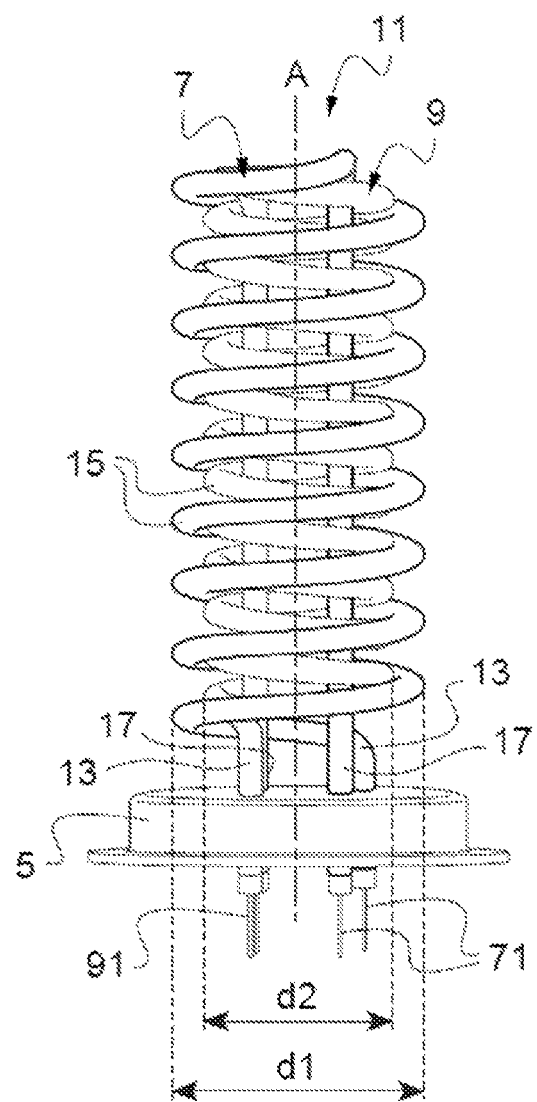
FIG. 2 shows a heating body of the electrical heating device of FIG. 1 comprising two electrical heating elements.

The base 5 and the electrical heating element or elements 7 and 9 form an assembly referred to as the heating body 11 which can be seen more clearly in FIG. 2. In the example shown, the arrangement of the base 5 and the electrical heating element or elements 7, 9 defines a generally cylindrical shape of the heating body 11. The latter thus has a first longitudinal end formed by the base 5 and a second longitudinal end opposite the base 5.

FIG. 2 shows in particular an embodiment of a heating body 11 comprising a first electrical heating element 7 and a second electrical heating element 9. Of course, other configurations may be envisaged, such as a single electrical heating element or more than two electrical heating elements. This FIG. 2 shows the relative arrangement of the two electrical heating elements 7, 9.

In the embodiment shown, the two electrical heating elements 7, 9 extend longitudinally inside the liquid circulation chamber 30 over the same length, or height with reference to the orientation of FIG. 2.

At least one electrical heating element 7, 9 may define a generally hollow shape, such as a cylindrical shape. The electrical heating elements 7, 9 are for example of generally tubular shape and may be arranged, for example at least partially wound, so as to define the generally hollow shape, such as a cylindrical shape. In particular, at least one electrical heating element 7, 9 has at least partially a helical shape.

According to the particular embodiment shown, the electrical heating elements 7, 9 comprise a first terminal section 13, secured to the base 5, continuing with an intermediate portion such as a wound portion 15, of helical shape, extending along the longitudinal axis A, and ending in a second terminal section 17. The first terminal sections 13 and second terminal sections 17 extend between the wound portion 15 of the respective electrical heating element 7, 9 and the base 5. The terminal sections 13, 17 are respectively equipped at their ends with one of the electrical terminals 71, 91.

Moreover, in the particular example shown, the second terminal sections 17 of the electrical heating elements 7, 9 extend straight in a central zone inside the wound portions 15. The second terminal section 17 makes it possible to join the distal end, relative to the base 5, of the wound portion 15 to said base 5.

The two electrical heating elements 7, 9 may be concentric, one being placed around the other. In the example shown, the first electrical heating element 7 is defined by a first diameter d1 and the second electrical heating element 9 is defined by a second diameter d2 smaller than the first diameter d1, such that the first electrical heating element 7 is placed around the second electrical heating element 9. In this configuration, the first electrical heating element 7 therefore forms an external element while the second electrical heating element 9 forms an internal element.

In particular, in the case of electrical heating elements 7, 9 at least partially of helical shape, the wound portions 15 of the electrical heating elements 7, 9 are wound around the same axis of winding, which is here coincident with the longitudinal axis A.

The heating body 11 is advantageously arranged in the housing 3 such that, in a plane orthogonal to the longitudinal axis A, the points on the outer surface of the wound portion 15 of at least one of the electrical heating elements 7, 9 are equidistant, or substantially equidistant, from an internal surface of the housing 3.

Other configurations are possible. For example, two or more electrical heating elements may be arranged in axial alignment. One or more electrical heating elements may or may not be placed around or inside these aligned electrical heating elements.

Figure 3:
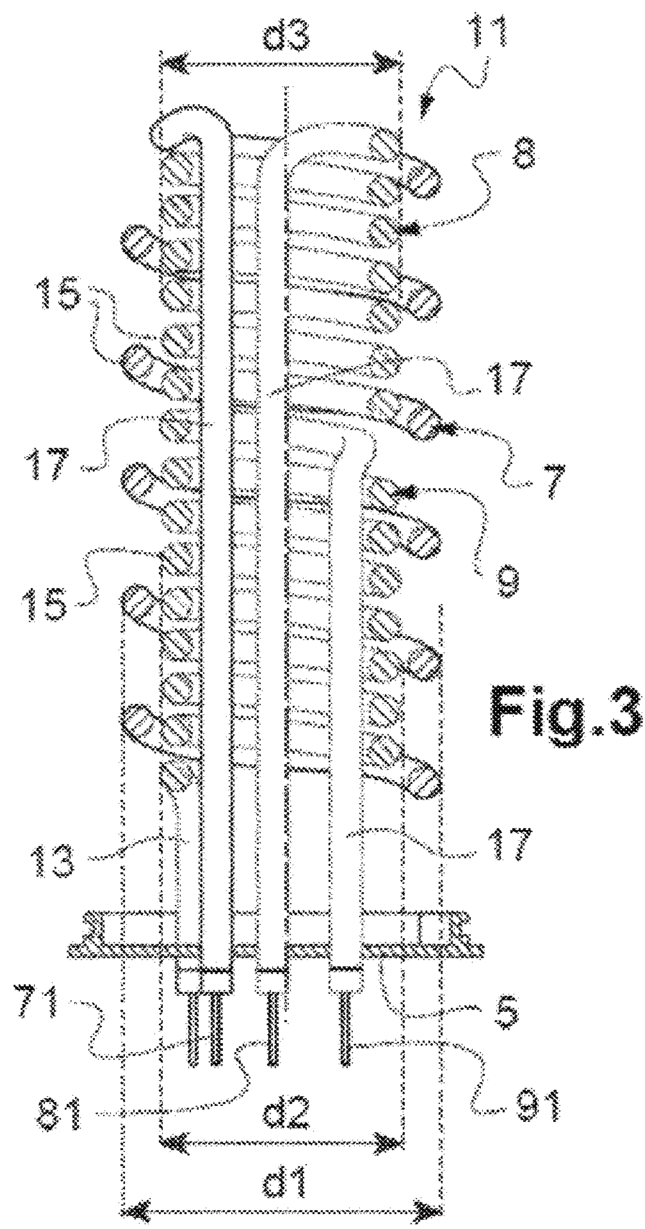
FIG. 3 shows a heating body comprising three electrical heating elements.

An example of a variant embodiment is shown in FIG. 3. In this example, the heating body 11 comprises three electrical heating elements 7, 8, 9, each provided at its ends with respective electrical terminals 71, 81, 91. A first electrical heating element 7, defined by a first diameter d1, a second electrical heating element 9, defined by a second diameter d2 and a third electrical heating element 8, defined by a third diameter d3. The first diameter d1 is greater than the second diameter d2 and the third diameter d3. The second and third diameters d2 and d3 may be equal.

The various electrical heating elements 7, 8, 9 are arranged such that the first electrical heating element 7 is placed around the second and the third electrical heating elements 8, 9. In particular, and as shown in FIG. 3, the third electrical heating element 8 is arranged in the axial extension and at the end of the second electrical heating element 9, and these two electrical heating elements 8 and 9 have a common axis of winding, which is coincident with the axis of winding of the first electrical heating element 7, also coincident with the longitudinal axis A.

According to another variant not shown, the second electrical heating element and the third electrical heating element 9, 8 may be placed around the first electrical heating element which would in this case be of smaller diameter.

Figure 4:
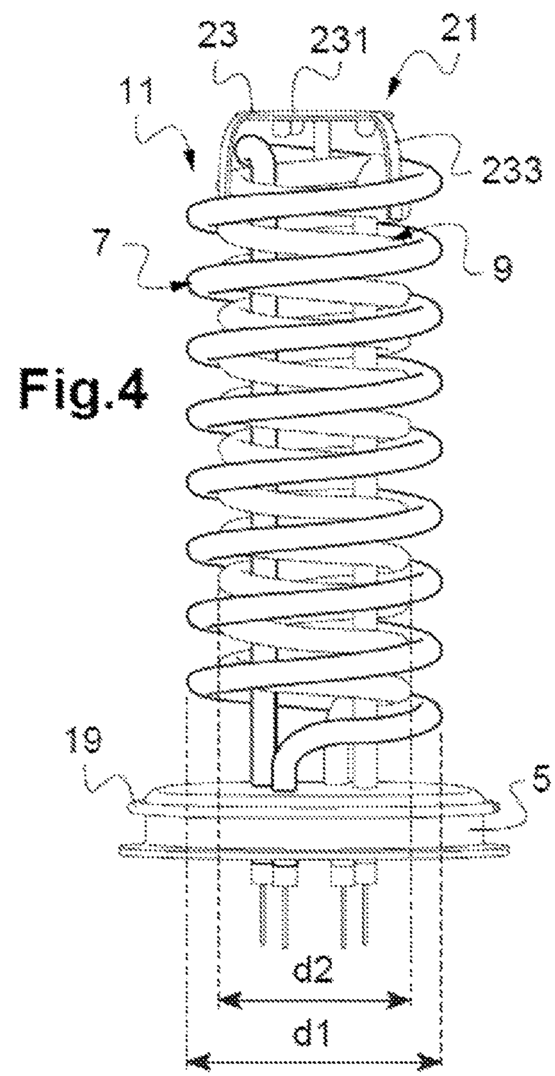
FIG. 4 shows a mechanical connection element according to a first embodiment assembled on the heating body of FIG. 2.
Figure 5:
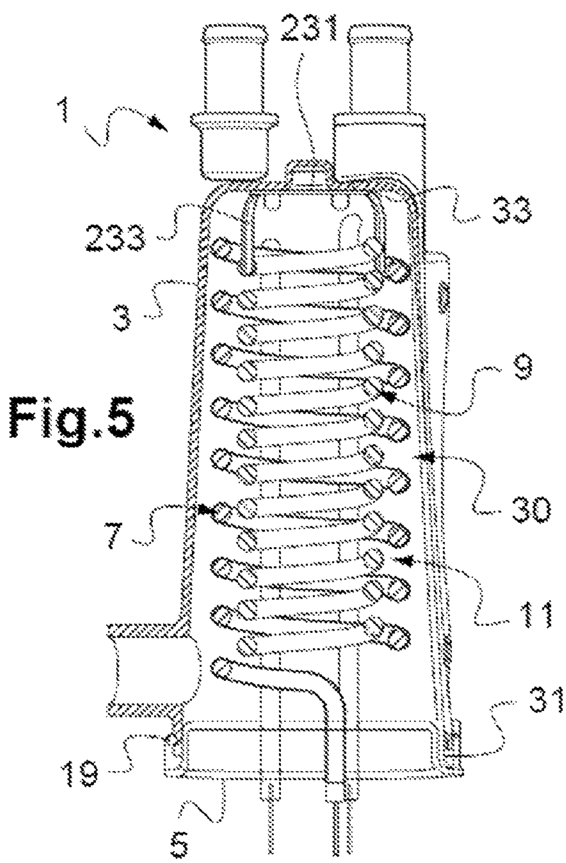
FIG. 5 is a sectional view of an electrical heating device comprising the heating body and the mechanical connection element of FIG. 4.
Figure 6:
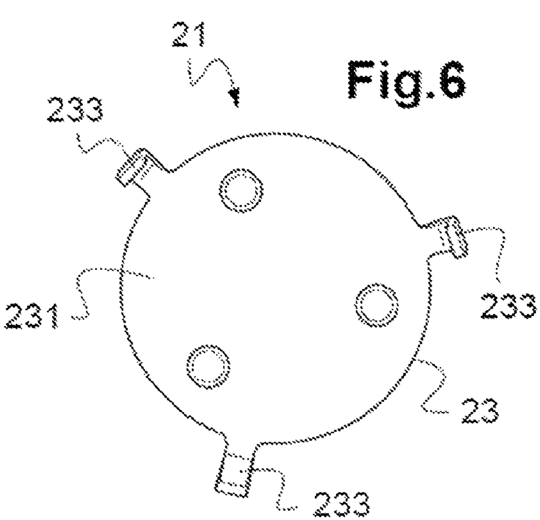
FIG. 6 is a first view of the mechanical connection element of FIGS. 4 and 5.
Figure 7:
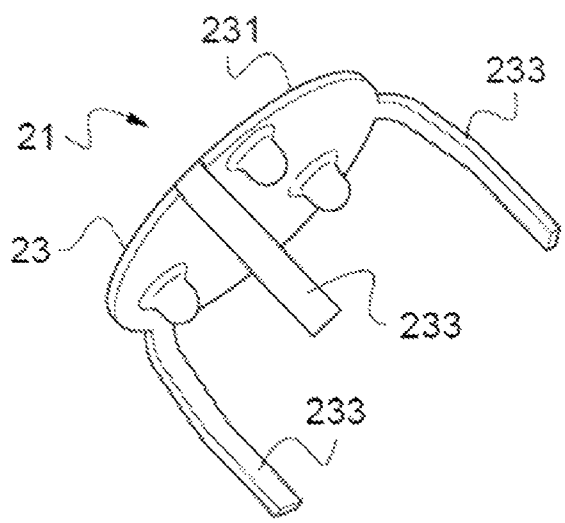
FIG. 7 is a second view of the mechanical connection element of FIGS. 4 and 5.

Referring to FIGS. 4 and 5, a seal 19, for example of annular shape, is advantageously arranged at the bottom of the heating body 11, in a receiving groove located between the base 5 and the housing 3 in the assembled state of the electrical heating device 1, in order to seal the liquid circulation chamber 30.

The electrical heating device 1 further comprises at least one mechanical connection element 21 arranged in the liquid circulation chamber 30, mechanically connecting the electrical heating element or elements 7, 9 and the internal surface of the housing 3 extending facing the heating body 11, so as to form a second mechanical connection distinct from the first mechanical connection. A mechanical connection is therefore added between the internal surface of the chamber 30 and the electrical heating element or elements 7, 9.

Various embodiments of the mechanical connection element 21 are shown in FIGS. 4 to 18. The heating device 1 may comprise a single mechanical connection element 21 or, on the contrary, several mechanical connection elements 21.

In general, the second mechanical connection is preferably ensured by at least three points of contact with the or at least one of the electrical heating elements 7, 8, 9, when several are provided. In particular, the second mechanical connection is ensured by at least three points of contact with each electrical heating element 7, 8, 9.

The mechanical connection element 21 is in particular provided to mechanically connect the internal surface of the housing 3 to at least one winding of an electrical heating element 7, 8, 9 when the electrical heating elements 7, 8, 9 are at least partially of helical shape as described above.

The or at least one of the mechanical connection elements 21 may be arranged in the liquid circulation chamber 30, mechanically connecting the internal surface of the housing 3 to a longitudinal end of one or more electrical heating elements 7, 8, 9. It may in particular be arranged transversely facing a longitudinal end of at least one electrical heating element 7, 8, 9.

In particular, the or at least one of the mechanical connection elements 21 may be provided opposite the base 5.

When the heating body 11 comprises at least two separate electrical heating elements 7, 8, 9, the or at least one of the mechanical connection elements 21 may be arranged between the two separate elements 7, 8, 9, in order to maintain a distance so that they do not come into contact with one another and there is no overlap. Preferably, the separate electrical heating elements 7, 8, 9, and the or at least one of the mechanical connection elements 21 are arranged to limit or even prevent any direct contact between the electrical heating elements 7, 8, 9, whether at their own terminal sections 13 and 17 or at their wound portion 15.

When the heating body 11 comprises at least two concentric electrical heating elements 7, and 8 or 9, one being placed around the other, the mechanical connection element 21 may be arranged between these two electrical heating elements in a plane orthogonal to the longitudinal axis A.

When the heating body 11 comprises at least two electrical heating elements 8, 9 arranged in the axial extension of one another, the mechanical connection element 21 may be arranged axially between these two electrical heating elements 8, 9.

According to the embodiments described with reference to FIGS. 4 to 16, the mechanical connection element 21 takes the form of an intermediate part 23, or 25, or 26, or 27, or 28, 29, arranged between the internal surface of the housing 3 and the heating body 11. The or at least one of the mechanical connection elements 21 may be arranged between the heating body 11 and an end or side internal surface of the housing 3.

The second mechanical connection is therefore an indirect connection between the housing 3 and the electrical heating element or elements 7, 8, 9.

Such an intermediate part 23, 25, 26, 27, or 28, 29, is made of a thermally conductive material, so as to form a thermal bridge between the electrical heating elements 7, 9 and the housing 3. This facilitates the measurement of the temperature of the electrical heating elements, even when there is no liquid in the circulation chamber 30.

The material is chosen so as to withstand a large number of cycles. It is in particular a metal, configured to withstand the operating temperatures of the electrical heating elements with which the mechanical connection element is in mechanical contact.

Such an intermediate part 23, 25, 26, 27, or 28, 29 is at least partially elastic and flexible, making it possible to compensate for the ranges of tolerances of the electrical heating device. More generally, the intermediate part 23, 25, 26, 27, or 28, 29 is shaped so as to obtain a balance between rigidity and flexibility to guarantee mechanical contact with the electrical heating elements 7, 8, 9 in the circulation chamber 30 without crushing them. The intermediate part 23, 25, 26, 27, or 28, 29 may be configured to withstand a holding force which may vary, purely as an example, between 10N and 50N.

According to one or other of the embodiments described below, the intermediate part 23, 25, 26, 27, or 28, 29, is shaped in a complementary manner to the elements with which it is intended to interact.

First Embodiment

FIGS. 4 to 7 illustrate a first embodiment according to which the electrical heating device 1 comprises two electrical heating elements 7, 9 as described with reference to FIG. 2, and an intermediate part 23 configured to ensure several points of contact with at least one or each electrical heating element 7, 9.

This intermediate part 23 comprises a core 231 arranged transversely facing a longitudinal end of the heating body 11. This core 231 is advantageously centered on the longitudinal axis A.

The intermediate part 23 further comprises a predefined number of contact tabs 233 extending from the core 231. Preferably, at least three contact tabs 233 or a multiple of three are provided.

The core 231 of the intermediate part is for example arranged to bear against the internal surface of the housing 3 at the second longitudinal end 33 of the housing 3, opposite the base 5. The longitudinal end 33 of the housing 3 is an end surface of circular section according to the example of the cylindrical housing 3 shown.

The intermediate part is held pressed against the internal surface of the housing 3 by the stress exerted by the electrical heating elements 7, 9 when they are received in the housing 3.

The core 231 may have a shape complementary to the general shape of the heating body 11, in particular of the longitudinal end of the heating body 11 facing which it is arranged. The core 231 may also have a shape complementary to the shape of the internal surface of the housing 3 against which it is pressed.

In the example shown, the core 231 has the general shape of a disk. The disk has for example a diameter which may or may not be close to or correspond to the diameter of one of the electrical heating elements.

The arrangement of the contact tabs 233 is linked to the shape of the heating body 11, and in particular to the longitudinal end of the heating body 11 with which the intermediate part interacts. According to the example shown of the heating body 11 of generally cylindrical shape, the contact tabs 233 are arranged in a circular manner They are advantageously regularly distributed over 360°.

The contact tabs 233 may be of any suitable shape to ensure contact with one or more electrical heating elements 7, 9. In the example shown, the contact tabs 233 are straight. They extend longitudinally from the core 231 along an axis parallel or substantially parallel to the longitudinal axis A. According to this first embodiment, all the tabs 233 extend in the same orientation with respect to the longitudinal axis A, they all extend here parallel to the longitudinal axis A. The tabs 233 all extend from the same circumference of the core 231.

According to the first embodiment, all the contact tabs 233 may come into contact with at least one electrical heating element 7, 9, either inside or outside this electrical heating element 7, 9.

Moreover, the contact tabs 233 have a length calculated so as to ensure at least three points of contact with at least one electrical heating element 7, 9. In particular, as shown in FIGS. 4 and 5, at least one of the contact tabs 233 is shaped so as to come into contact with each of the two electrical heating elements 7, 9.

The contact tabs 233 extend for example from the peripheral edge of the core 231. They extend in the direction of the heating body 11, more precisely in the direction of the electrical heating elements 7, 9. In particular, according to this first embodiment, the contact tabs 233 are respectively arranged between the two electrical heating elements 7 and 9. This ensures that a predetermined distance is maintained between the two electrical heating elements 7, 9.

The contact tabs 233 may possibly have flexibility allowing deformation of the contact tabs 233 to ensure they are positioned between the two concentric electrical heating elements 7, 9.

For example, the contact tabs 233 could be at least partially curved or inclined relative to the longitudinal axis A. Such a shape would promote deformation of the contact tabs when the intermediate part 23 and the heating body are inserted in the housing 3, ensuring mechanical contact between the two.

The above description relates to a heating body 11 comprising two electrical heating elements 7, 9. Alternatively, the heating body 11 may comprise three electrical heating elements 7, 8, 9 as described with reference to FIG. 3, and in this case, the intermediate part 23 is arranged so as to ensure several points of contact with the first and third electrical heating elements 7 and 8. Alternatively or in addition, such an intermediate part 23 could also be provided between the two electrical elements 8, 9, in the axial extension of one another.

Second Embodiment

Figure 8:
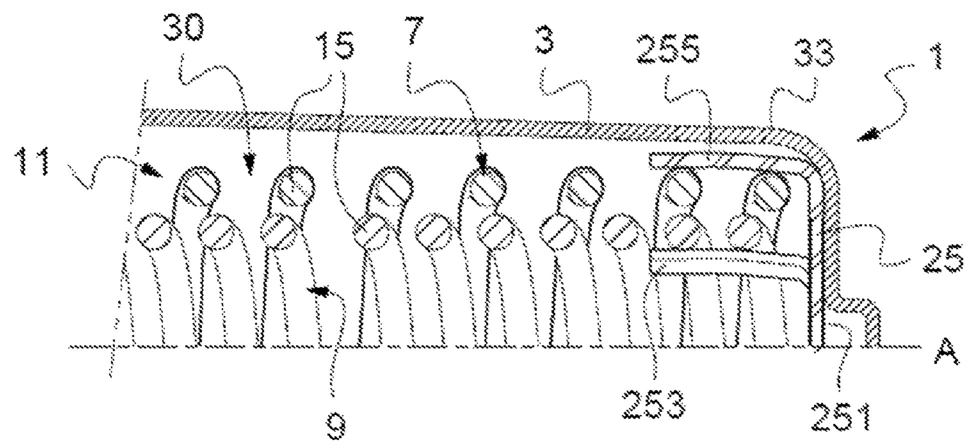
FIG. 8 is a sectional view of an electrical heating device comprising a heating body and a mechanical connection element according to a second embodiment.

FIG. 8 shows a second embodiment of the intermediate part 25 forming the mechanical connection element 21. Only differences with respect to the first embodiment are detailed below.

The intermediate part 25 comprises a core 251 from which extend several tabs 253, 255, at least some 255 of which are arranged in contact with the internal surface of the housing 3.

The core 251 may or may not be similar to the core 231 described with reference to the first embodiment of FIGS. 4 to 7. The core 251 may have the shape of a disk or alternatively an annular shape with a central bore.

Like the first embodiment, the core 251 may be pressed against the internal surface of one of the longitudinal ends of the housing 3, in this case the second longitudinal end 33.

The intermediate part 25 may comprise at least one first tab, referred to as the internal tab 253, and at least one second tab, referred to as the external tab 255. Preferably, the intermediate part 25 comprises at least three internal tabs 253 and at least three external tabs 255. The internal tabs 253 extend from the core 251 toward the inside of the heating body 11, that is to say toward the inside of the generally hollow shape of the heating body 11, in particular in the example shown toward the inside of the generally hollow shape of the second electrical heating element 9. The external tabs 255 extend from the core 251 toward the outside of the heating body 11, in particular toward the outside of the first electrical heating element 7 placed around the second electrical element 9.

The external tabs 255 may be shaped so as to ensure mechanical contact with the internal surface of the housing 3; this is in particular a side surface of the housing 3. The external tabs 255 may be shaped so as to also ensure mechanical contact with an electrical heating element, in this example the first electrical heating element 7. In this example, all the contact tabs, here the external tabs 255, which are arranged between the internal surface of the housing 3 and the first electrical heating element 7, are arranged in contact with both. Alternatively, provision may be made for the external tabs to be alternately in contact with the internal surface of the housing and with the electrical heating element 7.

As before, the contact tabs 253, 255 may be straight. The external tabs 255 may extend from the peripheral edge of the core 251. As regards the internal tabs 253, these may extend from another region, for example a more central region, of the core 251. In particular, according to the example shown, the internal tabs 253 and 255 extend from different regions, more precisely different circumferences in this example. As described above, the internal tabs 253 extend from the core 251 toward the inside of the generally hollow shape of the heating body 11, that is to say in the example shown toward the inside of the generally hollow shape of the second electrical heating element 9. They bear against the second electrical heating element 9, from the inside.

Like the first embodiment, all the external tabs 255 extend in the same orientation with respect to the longitudinal axis A, they all extend here parallel to the longitudinal axis A. The external tabs 255 all extend from the same circumference of the core 231.

Likewise, all the internal tabs 253 extend in the same orientation with respect to the longitudinal axis A, they all extend here parallel to the longitudinal axis A. The internal tabs 253 all extend from the same circumference of the core 231.

Furthermore, according to the example shown, all the tabs, both internal 253 and external 255, are all oriented in the same way.

In the example shown, a single intermediate part 25 is provided at one longitudinal end of the heating body 11. According to the variant embodiment of the heating body 11 described above with reference to FIG. 3 with at least two electrical heating elements, for example 8 and 9, in the axial extension of one another, it is possible to envisage arranging another intermediate part 25 as described with reference to FIG. 8, axially between these two electrical heating elements 8, 9. In this case, this other intermediate part 25 would be held only against the internal side surface of the housing 3. It is also possible to envisage arranging such an intermediate part 25 only between two electrical heating elements in the axial extension of one another, and not at the end of the heating body 11.

Third Embodiment

Figure 9:
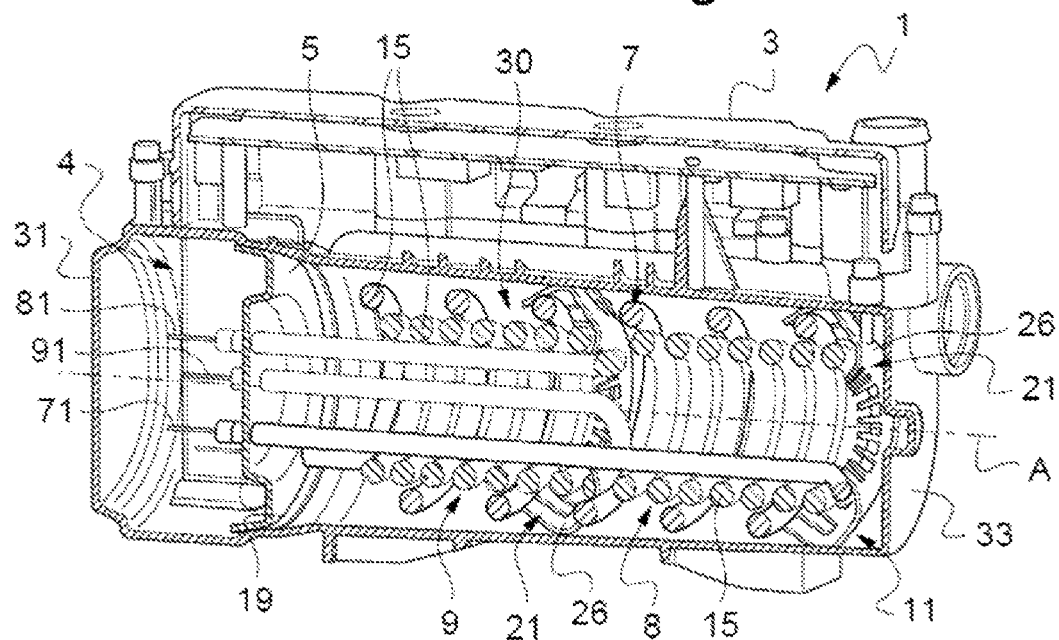
FIG. 9 is a sectional view of an electrical heating device comprising the heating body of FIG. 3 and two mechanical connection elements according to a third embodiment.
Figure 10:
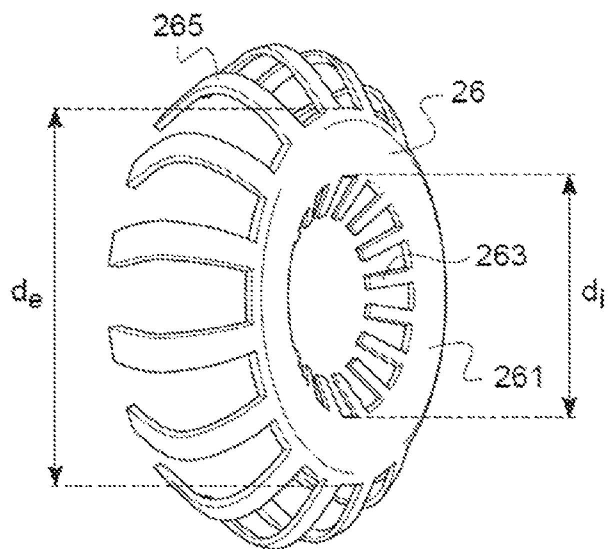
FIG. 10 is a perspective view of the mechanical connection element according to the third embodiment.

FIGS. 9 and 10 show a third embodiment of an intermediate part 26 forming the mechanical connection element 21. Only differences with respect to the second embodiment are detailed below.

According to the third embodiment, the intermediate part 26 comprises contact tabs 263, 265 extending from a core 261, at least some 265 of which are curved. The curved contact tabs 265 extend for example radially from the core 261 in the direction of the internal surface of the housing 3 in the assembled state of the electrical heating device 1. Then, by way of example, these contact tabs 265 may perform a half-turn or even form a bend, giving them the curved shape.

When the intermediate part 26 is assembled in the liquid circulation chamber 30, the curved contact tabs 265 may be deformed so as to be correctly positioned and ensure the desired mechanical contact. According to a particular non-limiting example, the heating body 11 may be assembled with at least one such intermediate part 26. When the assembly is inserted in the liquid circulation chamber 30, the contact tabs 265 of the intermediate part 26 may be deformed due to the stress exerted by the internal surface of the housing 3 and the electrical heating elements 7, 8, 9.

The core 261 is for example of generally annular shape defined by an inner circle of inside diameter $d_i$ and an outer circle of outside diameter $d_e$. The inside diameter $d_i$ is smaller than the outside diameter $d_e$.

FIG. 9 shows a configuration of the heating body with three electrical heating elements 7, 8, 9, as described above with reference to FIG. 3. A first intermediate part 26 is arranged with its core 261 facing a longitudinal end of the heating body 11, in particular in contact with said end, while a second intermediate part 26 is arranged axially between the second and third electrical heating elements 8 and 9. This second intermediate part 26 is arranged with its core 261 facing and in contact with, on one side, a longitudinal end of the wound portion 15 of the second electrical heating element 9 and, on the other side, facing and in contact with a longitudinal end of the wound portion 15 of the third electrical heating element 8, more precisely facing and in contact with, on one side and the other, ends of the wound portions 15 of these electrical heating elements 8, 9. In particular, the second intermediate part 26 is in contact with the end of the second or the third electrical heating element 8 and 9.

In the example shown in FIGS. 9 and 10, the intermediate part 26 comprises a first series of tabs, referred to as internal tabs 263, and a second series of tabs, referred to as external tabs 265.

The internal tabs 263 extend from the inside of the annular core 261, that is to say from the inner circle, toward the inside of the generally hollow shape of the heating body 11. In the example shown, these internal tabs 263 are straight or substantially straight.

According to the configuration in FIG. 9 of the heating body 11 with three electrical heating elements 7, 8, 9, the internal tabs 263 of the first intermediate part 26, arranged at the longitudinal end of the heating body 11, extend toward the inside of the generally hollow shape of the third electrical heating element 8. As for the internal tabs 263 of the second intermediate part 26 arranged between the second and third electrical heating elements 9, 8, these extend toward the inside of the generally hollow shape of the second electrical heating element 9.

The external tabs 265 of the intermediate part 26 extend from the outside of the annular core 261, that is to say from the outer circle, toward the outside of the heating body 11. In the example shown, the external tabs 265 extend toward the outside of the first electrical heating element 7 placed around the two other electrical heating elements 8, 9. In the example shown, these external tabs 265 are the curved contact tabs as defined above.

Furthermore, FIG. 9 shows the cavity 4 in the electrical heating device 1, separated from the liquid circulation chamber 30 by the base 5, into which the respective electrical terminals 71, 81, 91 of the electrical heating elements 7, 8, 9 open, and in which an electrical circuit may for example be mounted.

The above description relates to a heating body 11 comprising three electrical heating elements 7, 8, 9, and two intermediate parts 26. As a variant, only one of these intermediate parts 26 may be provided at the end or between the two electrical heating elements 8, 9, the electrical heating elements 8, 9 being in the axial extension of one another. The heating body 11 may also comprise only two concentric electrical heating elements 7, 9 as described with reference to FIG. 2, and in this case, a single intermediate part 26 may be arranged with its core 261 facing a longitudinal end of the heating body 11, so to ensure several points of contact with these two electrical heating elements 7 and 9.

Fourth Embodiment

Figure 11:
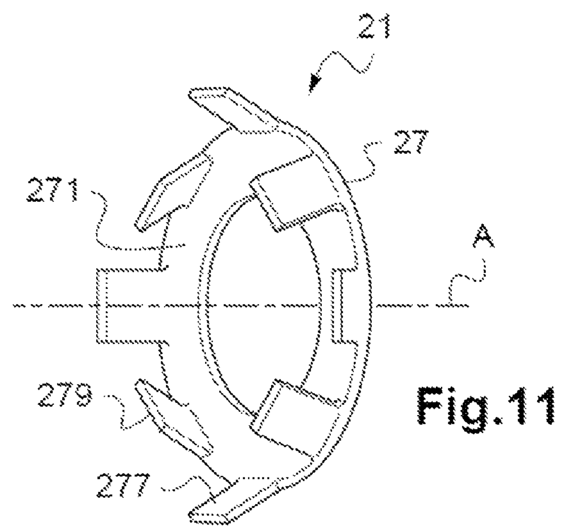
FIG. 11 is a perspective view of a mechanical connection element according to a fourth embodiment.
Figure 12:
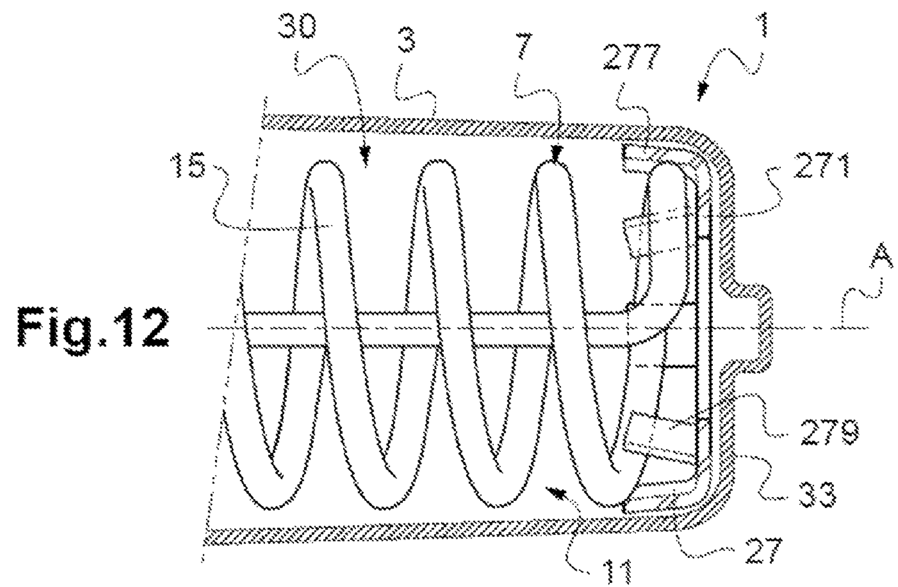
FIG. 12 is a first example of an arrangement of the mechanical connection element of FIG. 11 in a housing of the electrical heating device comprising one electrical heating element.
Figure 13:
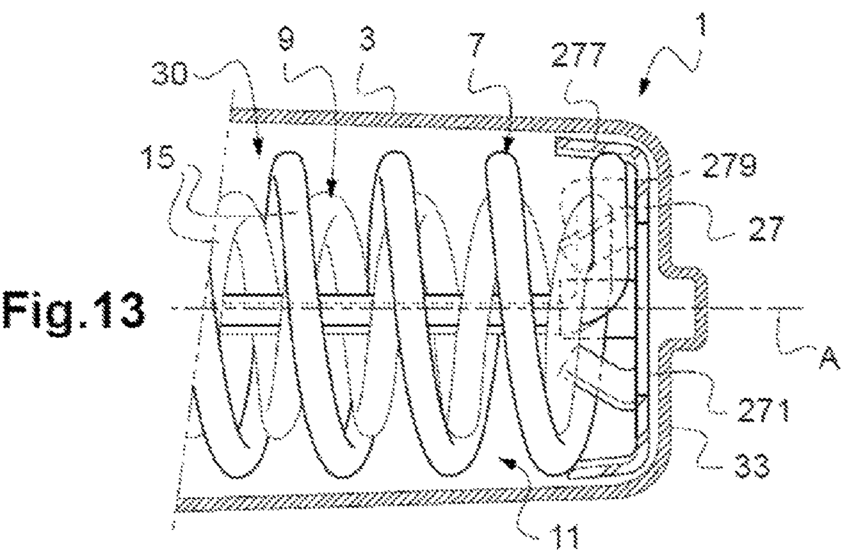
FIG. 13 is a second example of an arrangement of the mechanical connection element of FIG. 11 in a housing of the electrical heating device comprising two electrical heating elements.

FIG. 11 shows a fourth embodiment of an intermediate part 27 forming a mechanical connection element 21. As before, only differences with respect to the first embodiment are detailed below. FIGS. 12 and 13 show two examples of the arrangement of such an intermediate part 27 in the housing 3 of the electrical heating device 1.

The fourth embodiment differs from the first embodiment in that the intermediate part 27 comprises contact tabs 277, 279, extending from a core 271, which are not all oriented in the same direction. In the example shown, the tabs 277, 279 of different orientations extend from the same region, in this case the same circumference, of the annular core 271.

In the example shown, the core 271 has a generally annular shape. Alternatively, it could have the shape of a disk, as in the first embodiment. This core 271 is centered on an axis coincident with the longitudinal axis A when the intermediate part 27 is arranged in the housing 3.

At least some contact tabs 277, 279 may be inclined with respect to the longitudinal axis A, for example making an angle of around 30° to 45° before contact. In the example shown, the contact tabs 277, 279 are inclined with respect to the longitudinal axis A.

The tabs 277, 279 may be alternately inclined in different directions.

Alternating first contact tabs 277 and second contact tabs 279 may be provided for example, as shown.

The first contact tabs 277 may be oriented toward the outside of the intermediate part 27, that is to say away from the center of the intermediate part 27. All the first contact tabs 277 may have the same inclination with respect to the longitudinal axis A.

Conversely, the second contact tabs 279 may be oriented toward the inside of the intermediate part 27, that is to say toward the center of the intermediate part 27 or toward the longitudinal axis A. All the second contact tabs 279 may have the same inclination with respect to the longitudinal axis A.

For example, as shown schematically in FIG. 12, when the heating body 11 is assembled in the housing 3, the intermediate part 27 may be held in place inside the housing 3 by the electrical heating element 7 (or at least one of the electrical heating elements when the heating body comprises at least two) bearing against all of the contact tabs 277, 279.

Mechanical contact is made in particular with the distal end (relative to the base) of the wound portion 15 of the electrical heating element 7. The contact tabs 277 and 279 bear against the electrical heating element 7, alternately inside and outside the latter.

Such an arrangement makes it possible to limit longitudinal shifting of the heating body 11 inside the housing 3.

According to another example shown schematically in FIG. 13, the heating body 11 and the intermediate part 27 are arranged inside the housing 3 such that the contact tabs 277 and 279 are alternately bearing against the first electrical heating element 7 and the second electrical heating element 9.

In particular, the first tabs 277 may come into contact with the first electrical heating element 7 placed around the second electrical heating element 9. As for the second contact tabs 279, they may come into contact with the second electrical heating element 9. By way of non-limiting example, the first tabs 277 may be arranged outside the first electrical heating element 7. The second tabs 279 may be arranged inside the second heating element 9.

When the heating body 11 and the intermediate part 27 are assembled inside the housing 3, the electrical heating elements 7, 9 may deform the contact tabs 277, 279, thus guaranteeing mechanical contact.

Fifth Embodiment

Figure 14:
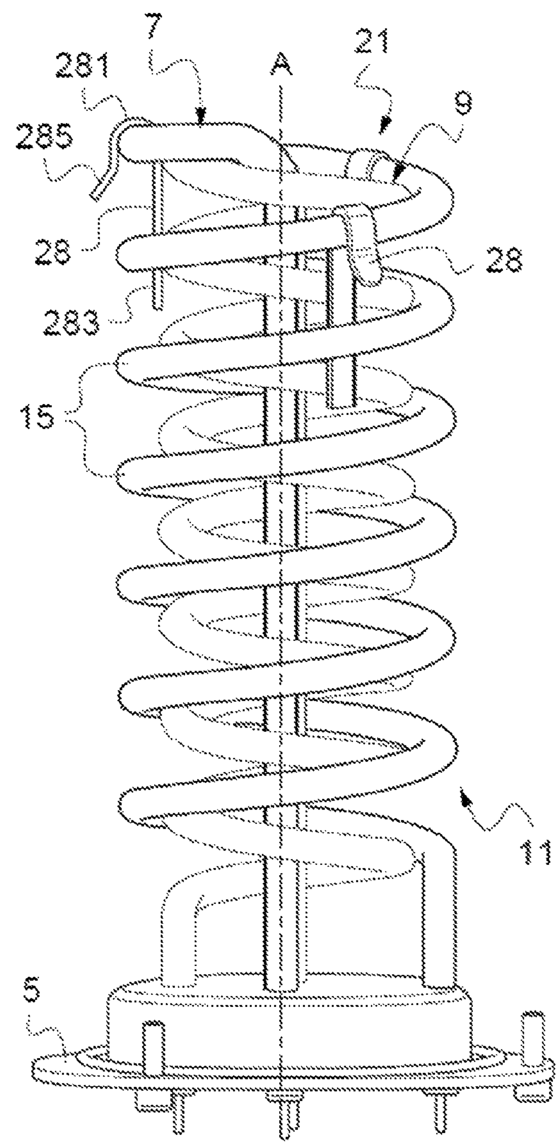
FIG. 14 shows mechanical connection elements according to a fifth embodiment assembled on the heating body of FIG. 2.
Figure 15:
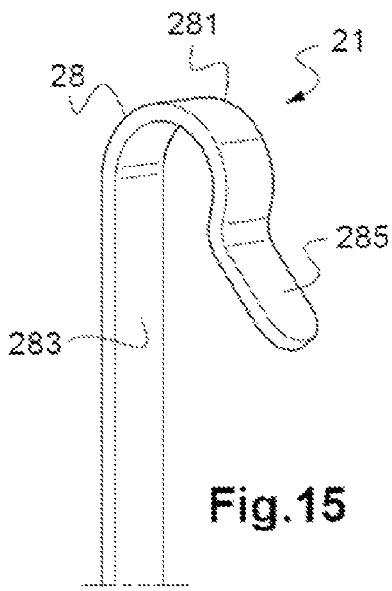
FIG. 15 is a perspective view of a mechanical connection element of FIG. 14.

FIGS. 14 and 15 show a fifth embodiment according to which several intermediate parts 28 in the form of a clip or slide are arranged so as to form several mechanical connection elements 21. Such an embodiment applies to a configuration of the heating body 11 with at least two concentric electrical heating elements 7, 9.

Preferably, at least three intermediate parts 28 in the form of a clip are provided. They are advantageously regularly distributed over 360°.

The intermediate parts 28 include a head 281 and at least a first tongue or tab 283 and a second tongue or tab 285 extending from the head 281. The two tongues or tabs 283 and 285 are in this example of different lengths. The head 281 is advantageously a rounded part of the clip. The first tab 283, the longer in this example, may be straight or substantially straight. The second tab 285, the shorter in this example, may also be straight or substantially straight.

When assembled on the heating body 11, the head 281 is arranged to bear on an electrical heating element, more specifically the external electrical heating element. This is the first electrical heating element 7 in the example shown. The clip is thus held in place. The rounded shape allows the head 281 to be partially wrapped around the external electrical heating element 7 of tubular shape.

The heads 281 of the intermediate parts 28 are arranged on the distal end, relative to the base 5, of the wound portion 15 of the first electrical heating element 7.

The first tab 283 extends between the two electrical heating elements 7, 9 and the second tab 285 extends toward the outside of the heating body 11, and therefore of the perimeter of the concentric electrical heating elements 7, 9. When the assembly is mounted inside the housing 3, the second tab 285 comes into contact with the internal surface of the housing 3, such that the first tab 283 is pushed and held against the internal electrical heating element. This is the second electrical heating element 9 in the example shown. The first tab 283 is therefore wedged between the concentric electrical heating elements 7, 9.

The length of the contact tabs 283, 285 is calculated so as to ensure contact between the second tab 285 and the internal surface of the housing 3 and contact between the clip and a predefined number of windings, for example at least two windings, of the internal electrical heating element 9.

Figure 16:
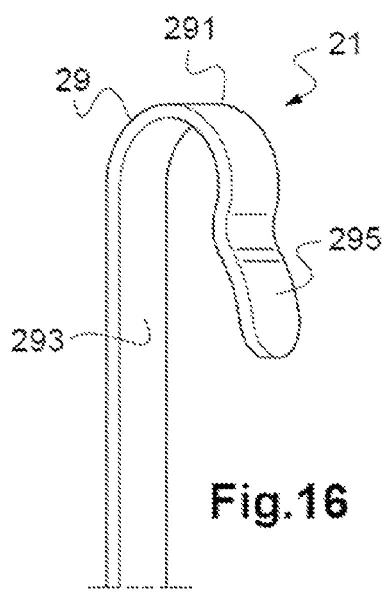
FIG. 16 is a perspective view of a variant of the mechanical connection element of FIG. 15.

FIG. 16 shows a variant of the intermediate part 29 which differs from the fifth embodiment of FIG. 15 in that the second tab 295 which extends from the head 291 is less protruding. It may for example be flattened. Advantageously, the second tab 295 is domed or convex with its convexity oriented toward the internal surface of the housing 3. The domed shape avoids damaging the internal surface of the housing 3 upon mechanical contact with the clip.

The first tab 293 extending from head 291 may be similar to the first tab 283 of the fifth embodiment of FIG. 15. The rest of the description of the fifth embodiment applies to this variant.

Sixth Embodiment

Figure 17:
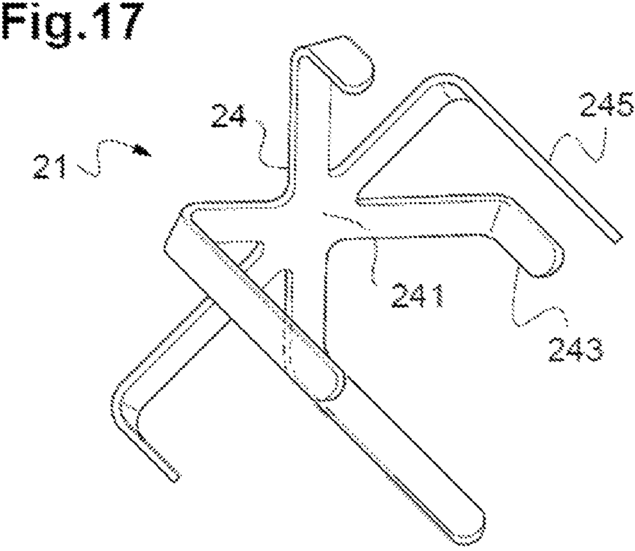
FIG. 17 is a perspective view of a mechanical connection element according to a sixth embodiment.
Figure 18:
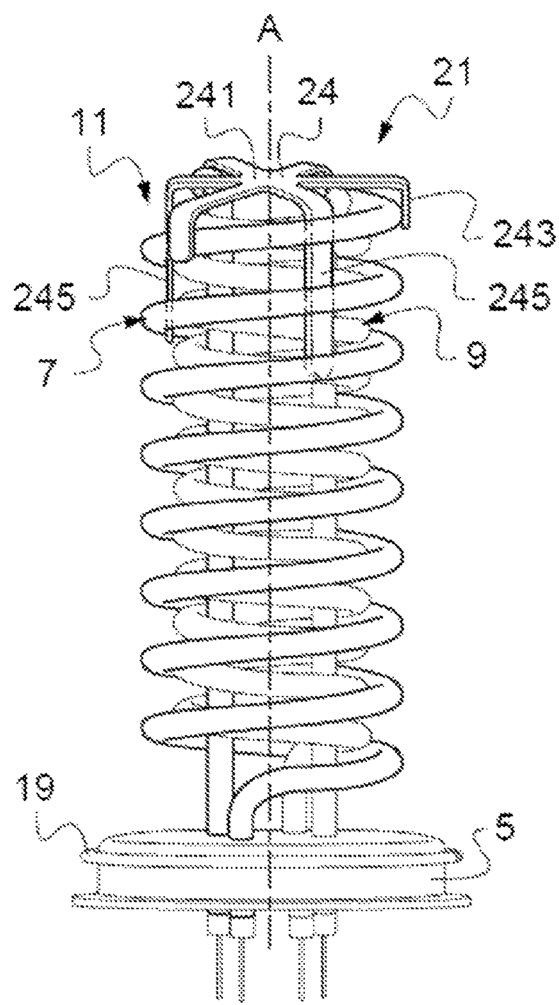
FIG. 18 shows the mechanical connection element of FIG. 17 assembled on the heating body of FIG. 2.

FIGS. 17 and 18 show a sixth embodiment of an intermediate part 24 forming a mechanical connection element 21.

The sixth embodiment differs from the second embodiment in that the intermediate part 24 comprises two series of tabs 243 and 245 extending from a central region of a core 241, for example in the form of a disk, first radially before being bent so as to extend toward the electrical heating element or elements 7, 9.

The first tabs 243 come into contact with the first electrical heating element 7 on the outside of the latter. The second tabs 245 come into contact with the second electrical heating element 9 being arranged for example between the two concentric electrical heating elements 7, 9.

According to the example shown, the tabs 243, 245 are not all bent to the same length. They are alternately bent to two different lengths. This results in first tabs 243 with a longer radial extension and second tabs 245 with a shorter radial extension.

According to this sixth embodiment, the tabs 243, 245 may all be bent so as to extend parallel to one another. Furthermore, in this example, the tabs 243, 245 extend in the direction of the electrical heating elements 7, 9 in a direction parallel or substantially parallel to the longitudinal axis A. The portion of the tabs 243, 245 extending in the direction of the electrical heating elements 7, 9 so as to ensure contact is referred to as the longitudinal extension.

The tabs 243, 245 have for example longitudinal extensions of different lengths. The longitudinal extensions of the first tabs 243 are in this case shorter than the longitudinal extensions of the second tabs 245.

Thus, the second mechanical connection ensured by the mechanical connection element or elements 21 according to one or other of the embodiments described above is additional to the securing of the electrical heating element or elements 7, 8, 9 to the base 5. The mechanical connection element or elements 21 make it possible to limit the movement of the electrical heating element or elements 7, 8, 9 of the heating body 11 within the housing 3.

The mechanical connection element 21 makes it possible to maintain a distance between the electrical heating element or elements 7, 8, 9 of the heating body 11 and the internal surface of the housing 3, for example at a longitudinal end 33 of the housing 3 and/or a side surface of the housing 3.

Moreover, when the heating body 11 comprises several electrical heating elements 7, 8, 9, the mechanical connection element 21 may make it possible to maintain the electrical heating elements 7, 8, 9 at the same distance from one another, with no or very little contact between them.

This makes it possible to prevent the elements of the heating body 11 from colliding inside the housing 3 when used in a motor vehicle, and thus to limit the generation of noise.

The invention claimed is:

1. An electrical heating device for heating a liquid for a motor vehicle, comprising:

a heating body;

a housing delimiting, at least partially, a liquid circulation chamber, the heating body comprising at least two electrical heating elements extending in the liquid circulation chamber and secured to an inner wall of said device delimiting, at least partially, the liquid circulation chamber, so as to form a first mechanical connection; and, at least one mechanical connection element arranged inside the liquid circulation chamber, mechanically connecting said at least one electrical heating element and an internal surface of the housing facing the heating body, so as to form a second mechanical connection distinct from the first mechanical connection, wherein the heating body comprises a base secured to the housing, the housing and the base delimiting, at least partially, the liquid circulation chamber, and wherein the first mechanical connection is between said at least one electrical heating element and the base, wherein said at least one mechanical connection element is arranged in the liquid circulation chamber opposite the base, wherein the at least two electrical heating elements are concentric and comprise an internal heating element and an external electrical heating element placed around the internal electrical heating element, and wherein at least a portion of said at least one mechanical connection element is arranged within an annular space between the concentric electrical heating elements, wherein said at least one mechanical connection element takes the form of an intermediate part, arranged between the internal surface of the housing and the heating body, and wherein the intermediate part is made in the form of a clip comprising a head arranged to bear on the external electrical heating element and comprising at least a first tab and a second tab extending from the head, such that the first tab is arranged to bear against the internal electrical heating element and the second tab is arranged to bear against the internal surface of the housing.

2. The device as claimed in claim 1, wherein said at least one electrical heating element has at least partially a helical shape.

3. The device as claimed in claim 1, wherein said at least one electrical heating element extends longitudinally in the liquid circulation chamber, and wherein said at least one mechanical connection element is arranged in the liquid circulation chamber, mechanically connecting the internal surface of the housing to a longitudinal end of said electrical heating element.

4. The device as claimed in claim 1, wherein the intermediate part is at least partially elastic and flexible.

* * * * *